(No Model.)    2 Sheets—Sheet 1.
W. FARMER.
Apparatus for Teaching Chemistry.
No. 242,821.    Patented June 14, 1881.
_Fig.1_    _Fig.2_
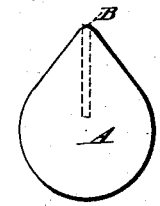   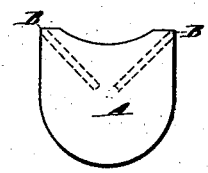
_Fig.3_    _Fig.4_
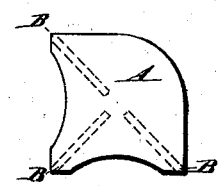   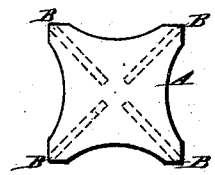
_Fig.5_    _Fig.6_
   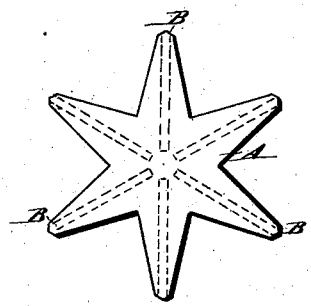
WITNESSES.    INVENTOR.
Charles C. Stetson.    William Farmer
Wm. C. Dey    by his attorney (No Model.) 2 Sheets—Sheet 2.
W. FARMER.
Apparatus for Teaching Chemistry.
No. 242,821. Patented June 14, 1881.
_Fig.7_
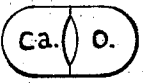
_Fig.8_
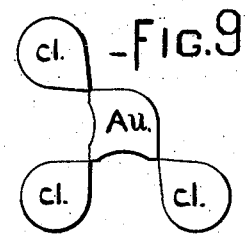
_Fig.9_
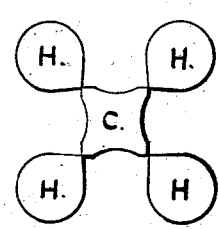
_Fig.10_
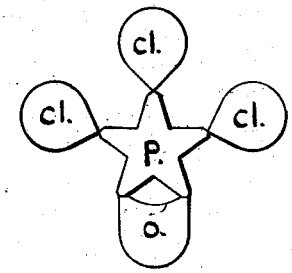
_Fig.11_
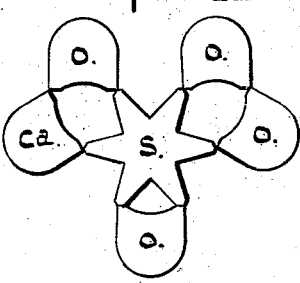
_Fig.12_
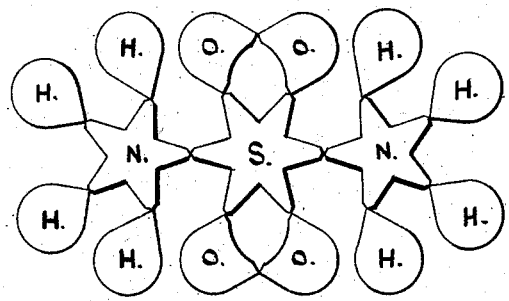
_Fig.13_
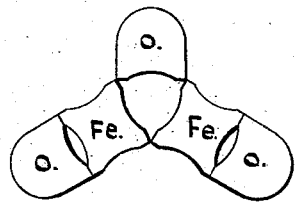
_Fig.14_
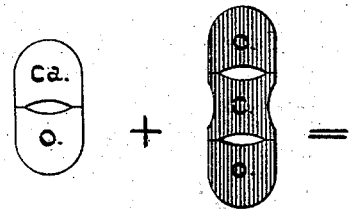
_Fig.15_ _Fig.16_
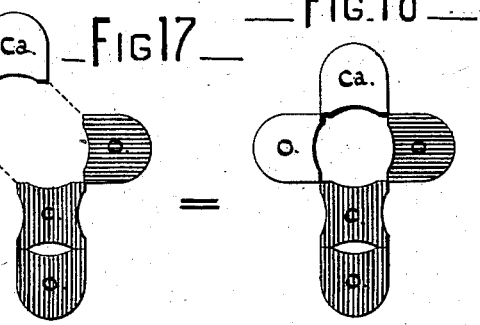
_Fig.17_ _Fig.18_
WITNESSES.
Charles C. Stetson
Wm C Dey
INVENTOR.
William Farmer
by his attorney

UNITED STATES PATENT OFFICE.

WILLIAM FARMER, OF ELIZABETH, ASSIGNOR OF ONE-THIRD TO WILLIAM MOONEY, OF CRANFORD, NEW JERSEY.

APPARATUS FOR TEACHING CHEMISTRY.

SPECIFICATION forming part of Letters Patent No. 242,821, dated June 14, 1881.

Application filed February 11, 1881. (No model.)

*To all whom it may concern:*

Be it known that I, WILLIAM FARMER, a subject of the Queen of Great Britain, residing at Elizabeth, in the county of Union, in the State of New Jersey, having an office and doing business in the city of New York, in the county and State of New York, have invented certain new and useful Improvements Relating to Means for Teaching Chemistry, which I term the "Kindergarten System;" and I do hereby declare that the following is a full and exact description thereof.

My apparatus may be used simply as a toy or game, without reference to the facts of chemistry. It may be used in cases of doubt to represent hypothetical conditions of the elements; but, in what I esteem its chief use, the several pieces of apparatus indicate fully determined and established facts, and the combinations of the pieces indicate the corresponding combinations of the elements which occur in Nature and in the arts.

I produce a number of blocks, which may be of uniform material and of general uniform size, or they may vary in these respects, as will be hereinafter indicated. The forms of outlines differ.

Investigations continued a hundred years or more have found matter composed of sundry simple elements which by their combinations in different proportions and under different conditions constitute all the chemical natures of matter. I employ a separate and distinct block for each element, as many of each in a set as will be likely to be required in the most complex combinations. I propose to distinctly mark on each the long-established symbols "O" for oxygen, "K" for potassium, &c. On the opposite face of each, or at some convenient point, I propose to also denote the atomic weight. I propose also to denote by colors, or otherwise, other characteristics, as the electro-positive or electro-negative quality of the element. I attach much importance to a peculiarity of the forms, which I will now describe.

It has been observed for many years, and has now become established by careful observation, that there is a limit to the number of other elements with which any element can combine. All the elements are capable of combining with one or more of the others; but there is found to be a limit to the number of atoms of the other elements with which any given element can combine at any one time. In other words, the elements differ in numerical capacity for combining with other elements. Some will combine with but one other element at a time, some with two, some with three, some with four. Nitrogen will combine with five other elements at the same time. There are some reasons to believe that sulphur will combine with six.

I make corresponding differences in the forms of my blocks. To represent those elements, of which hydrogen is an example, having the power of combining each with but one other element at a time, I give the blocks a nearly circular form, but with one distinct salient angle or point. I will term this the combining-point. Those elements, of which oxygen is an example, which have the power of combining with two other elements, and with but two at a time, I represent by a block, of which one side is rounded and the other side is formed with salient angles or combining points. Those elements, of which gold is an example, which have the power of combining with three, and but three, other elements at a time, I represent by a form having one portion rounded and three salient angles or combining-points. Elements, of which carbon is an example, which can combine with four I represent by a block having four combining-points. This may be an exact square, but I prefer having the sides somewhat hollowed, so as to make the points still more acute. Elements, of which potassium and nitrogen are understood to be the only examples now known, which are capable of combining with five other elements at the same time, I represent by a five-pointed star. I propose to represent sulphur as a six-pointed figure, but if the progress of discovery should establish that four is the proper combining number, I will substitute a corresponding form of block.

I take care that in all the blocks which have more than one point the points are of uniform distance apart. I propose to make the blocks with the points exactly one inch apart. The circular portion of the blocks should then be described on a half-inch radius.

Some of the advantages of the invention may be attained by these blocks in the simple form described. In using them the blocks representing the elements are simply applied on a table or some surface, and the blocks representing the proper elements to form the desired compound are placed with their angles in contact. But in what I esteem the most complete form of the invention I employ magnets, which, although necessarily of small size, can exert an appreciable influence in aiding to hold the points in contact after they have been properly placed. I manufacture a large number of small magnets, which may be cylindrical wires or nails of steel properly treated to impart permanent magnetism. Suitable holes being drilled in the blocks at the several points, the magnets are forced into the holes, and thereby held with one end at or near the middle of the block and the other end flush with the point or very slightly projecting. In some cases the magnets may be allowed to extend beyond the center. In case of single-pointed elements this may be done without difficulty. In case of dyads or two-pointed elements the magnets may cross each other.

I propose to employ vinegar-glue, or other cementing means to aid in insuring the retention of the metal within the body of the block; or I can screw-thread the magnets, employing machinery analogous to that used in the manufacture of cable-screws for the boot and shoe business. In such case the magnets are inserted by machinery with a corresponding turning motion. The magnets should be placed with their north pole at the surface, or with the south pole at the surface, according as the element is electro-negative or electro-positive. The electro-negative or acid-forming elements have the north pole at the surface. The electro-positive or alkaline elements have the south pole at the surface. It will be understood that this arrangement will sometimes prove incongruous. Many of the milder elements are electro-positive to one and electro-negative to another. I propose to put the north end projecting slightly out for mercury and all which are more electro-negative than mercury, and the south end for sulphur and all that are more electro-positive than sulphur.

The accompanying drawings form a part of this specification and represent what I consider the best means of carrying out the invention.

Figure 1 is a geometrical symbol of a monad element, or element having one combining-point. Fig. 2 is a geometrical symbol of a dyad element, or element having two combining-points; Fig. 3, a geometrical symbol of a triad element, or element having three combining-points; Fig. 4, a geometrical symbol of a tetrad element, or element having four combining-points; Fig. 5, a geometrical symbol of a pentad element, or element having five combining-points; Fig. 6, a geometrical symbol of a hexad element, or element having six combining-points. Fig. 7 represents a molecule of hydrochloric acid formed by the union of the two monad elements, hydrogen and chlorine. Fig. 8 represents a molecule of oxide of calcium or quick-lime formed by the union of the dyad elements, oxygen and calcium. Fig. 9 represents the union of the triad element, aurum or gold, and three atoms of the monad element, chlorine, forming the trichloride of gold, or $AuCl_3$. Fig. 10 represents the union of the tetrad element, carbon, with four atoms of the monad element, hydrogen, forming methane, or marsh-gas, ($CH_4$.) Fig. 11 represents the union of the pentad element, phosphorus, with three atoms of the monad element, chlorine, and one atom of the dyad element, oxygen, forming phosphoryl-chloride, ($POCl_3$.) Fig. 12 represents the union of the hexad element, sulphur, with three atoms of oxygen and one molecule of oxide of calcium, ($CaO$,) forming calcium sulphate or gypsum, ($CaSO_4$.) Fig. 13 represents one molecule of the hexad element, sulphur, united to four atoms of the dyad element, oxygen, and two molecules of ammonium ($NH_4$) which is composed of one atom of the pentad element, nitrogen, and four atoms of the monad element, hydrogen, the whole forming one molecule of ammonic sulphate, or sulphate of ammonia, ($NH_42SO_4$.) Fig. 14 represents the union of two tetrad elements, ($Fe$,) or iron, with three atoms of the dyad element, oxygen, forming ferric oxide or oxide of iron, ($Fe_2O_3$.) Figs. 15, 16, 17, and 18 show the use of the system in explaining the nature of chemical combinations or reactions. Fig. 15 represents a molecule of lime or oxide of calcium, ($CaO$,) and Fig. 16 represents a molecule of carbonic acid, ($CO_2$.) These two compounds, when united, form carbonate of lime, ($CaOCO_2$.) Fig. 17 shows the two molecules cracking up or separating; and Fig. 18 shows the molecule of carbonate of lime after the union of the two compounds oxide of lime and carbonic acid.

Shading or coloring of the different elements or compounds entering into the formation of new compounds using the same color or shade uniformly for a given element enables the student to keep in his mind the composition of the compounds, no matter how complicated they may be.

For a comparison of my system with the old systems of chemical notation, I give below the chemical reaction shown in Figs. 15, 16, 17, and 18 as it would be shown by the old method, thus: $CaO + CO_2 = CaCO_3 -$. The bodies of the blocks are designated by the letter A. The magnets are denoted by B.

The completed blocks A, having the magnets firmly placed just flush with their surfaces or projecting slightly, are to be made up in sets, and made an article of manufacture and trade. They can be used in schools or in family instruction. The exercises and games therewith may be varied indefinitely. All will aid in teaching chemistry. I propose as the leading uses that the teacher or one of the players shall demand a certain chemical compound, designating it by the name or by the ordinary arrangement of symbols on a paper or on a black-board, and that the pupils or other players shall be required to make the corresponding combinations of the blocks.

Another mode of teaching, or another form of game, is to let the teacher or one player make a combination of the blocks and call upon the class or upon the other players to give its name or write the symbols, or both.

The invention is capable of being modified in many of the points. The material of the blocks may be papier-maché, hard rubber, bone, ivory, glass, wood, or any convenient metal. I propose white metal, either plain or plated. The weight of this material will aid materially in holding the blocks firmly in place in the proper relations independently of the slight influence of the magnets. For blocks in which no magnets are needed accurately-formed castings of iron, properly finished by tumbling or otherwise, may be useful. I do not confine myself to any particular material or dimensions. Thick pasteboard, accurately cut and printed, may serve for cheap sets. Leather of proper thickness with an enameled or otherwise handsomely-finished surface may be used.

I esteem it important that the ordinary symbol for each element be conspicuously placed on the block. I also esteem it useful to attach the ordinary name in one or more languages. I use different tints and shades additional to the forms and the letters impressed or otherwise indicated to aid in distinguishing some or all of the principal elements. When glass or analogous brilliant material is used the colors may aid very greatly in rendering the chemical combinations distinct and impressing the characteristics thereof on the memory.

I propose to publish printed diagrams in the form of books and charts presenting many of the combinations, showing the several blocks in place, either of a corresponding size or on a more or less reduced or enlarged scale. The blocks and the charts will complement each other, and each aid to the understanding of the other.

Some of the advantages of the invention may be realized by the use of my forms and arrangements simply as printed figures on books or charts without any movable blocks, and of course without the magnetic qualities.

I claim as my invention—

1. The method of illustrating chemical combinations by figures or devices representing the different elements, each figure or device having as many salient angles as the element it represents has combining powers, and applied together substantially as and for the purposes herein described.

2. The set of blocks or separately movable pieces described, denoting chemical elements, and formed with points corresponding in number to the combining powers of the respective elements, so as to combine substantially in the manner and for the purposes herein specified.

3. The set of blocks described, having salient angles corresponding to the combining points or powers of the elements represented, and having magnets combined therewith, arranged to serve substantially as and for the purposes herein specified.

In testimony whereof I have hereunto set my hand at New York city, New York, this 2d day of February, 1881, in the presence of two subscribing witnesses.

WM. FARMER.

Witnesses:
CHARLES C. STETSON,
WILLIAM C. DEY.